United States Patent Office 3,371,484
Patented Mar. 5, 1968

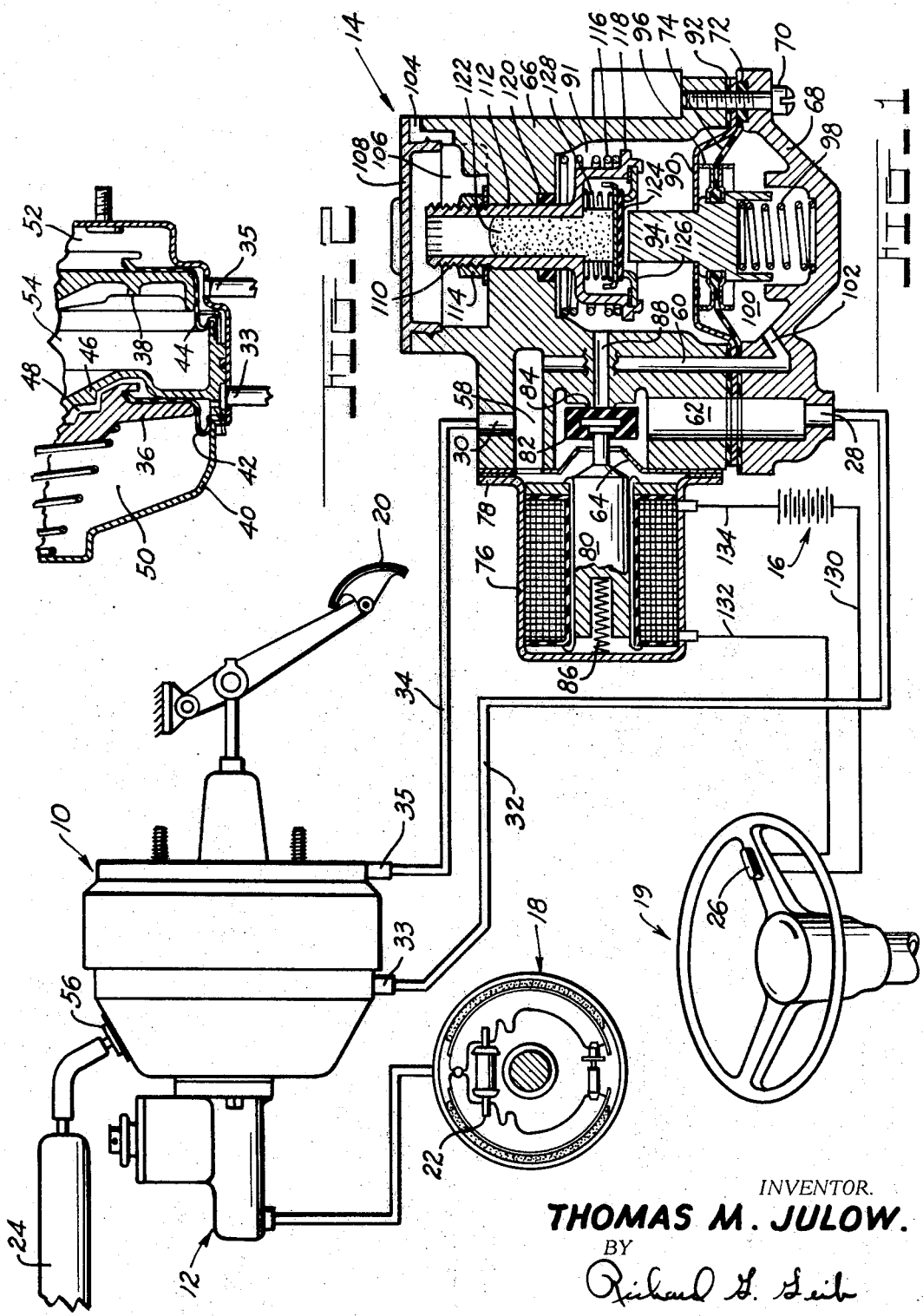

3,371,484
PEDAL AND BUTTON ACTUATED
BRAKE SYSTEMS
Thomas M. Julow, South Bend, Ind., assignor to The
Bendix Corporation, a corporation of Delaware
Filed Mar. 14, 1966, Ser. No. 533,885
5 Claims. (Cl. 60—54.5)

ABSTRACT OF THE DISCLOSURE

A remotely controlled valve operatively connected to a mechanically operated servomotor having tandem movable walls at least, which valve has means to sense the control chamber pressure for one of the walls as a reference to operation of the other of the walls.

This invention relates to a dual means of actuating a power brake servomotor of a power brake system for a vehicle. More particularly, the invention relates to a braking system that may be pedal actuated and actuated by a button located, for example, on the steering wheel of the vehicle.

In servomotor systems operable in conjunction with other controls, it has been observed that occupation with all the controls available to an operator thereof reduces the efficiency and interferes with the diligency of the operator. It is therefore a principal object of this invention to provide a servomotor system which is actuatable by at least two controls to reduce, if not eliminate, these problems.

It is another object of this invention to provide a power brake system having a tandem type servomotor with control means that will permit limited actuation of the servomotor by simple remote means to provide time for transmission between operation of the other controls and that control which will fully actuate the same servomotor system.

Another object of this invention will provide an electrically operable valving for a power brake servomotor in conjunction with a manual control means for the same servomotor.

Other and more detail objects of this invention will appear to those skilled in the art to which this invention relates from the following description of the drawings in which:

FIGURE 1 is a schematic servomotor system in accordance with the principles of this invention that also shows a solenoid valve in cross section;

FIGURE 2 is a partial cross section of a servomotor construction usable with the system embodying the principles of my invention.

With particular regard to FIGURE 1 there is shown a power brake system including a fluid pressure motor 10, a master cylinder 12, a solenoid valve 14, an electrical source 16, a wheel brake mechanism 18 and a vehicle steering wheel 19. In more detail there is shown a power brake system for an automobile which is, as usual, normally actuated by moving a brake pedal 20 to create a pressure differential in the motor 10. This then moves a piston, not shown, in the cylinder 12 to displace fluid to the brake 18 causing a wheel cylinder 22 to actuate the brakes of the automobile. The motor 10 is supplied with a vacuum from the intake manifold 24 of the vehicle's engine.

The conventional power brake system which embodies all of the elements, save the solenoid valve 14, is because of the principles of this invention, improved upon by providing additional actuating means whenever a button type switch 26 located on the steering wheel is depressed to close the contacts thereof. As may be appreciated by those skilled in the art, the switch 26 is of a spring loaded type, so that upon the release thereof by the operator of the steering wheel, the switch will open the contacts. In general, a depression of the switch 26 will close communication between ports 28 and 30 of the servomotor 10, connected to conduits 32 and 34 leading to ports 33 and 35 of the servomotor 10.

The servomotor 10 employed with this invention was of a tandem type. It has been partially cross sectioned by FIGURE 2 to show a front movable wall 36 and a rear movable wall 38 connected to a housing 40 by means of diaphragms 42 and 44. These walls 36 and 38 along with a partition 46 divide the servomotor into a first control chamber 48 and a first constant pressure chamber 50 and a second control chamber 52 and a second constant pressure chamber 54. The constant pressure chamber 50 and 54 are communicated by passageways through the partition 46 along the centerline of the unit by a tubular structure (not shown). Further details of the servomotor construction may be had from observing a copending application Ser. No. 494,581, assigned to the common assignee.

Before passing on the details of the solenoid valve 14, the fluid flow path in the power brake system may be generally described as follows: vacuum from the manifold 24 is introduced to the servomotor via a check valve 56 open to the constant pressure chamber 50. Vacuum then is introduced through the tubular structure (not shown) to the constant pressure chamber 54 where appropriate passages in the movable wall 38 (not shown) communicate this vacuum to a valve chamber within a boss of the movable wall 38. In the released position the valve chamber in the boss of the movable wall 38 is open to the control chamber 52 so that vacuum may be communicated to the port 35 connected to the port 30 of the valve 14 by a conduit 34. The inlet 30 in the valve 14 opens to a vacuum chamber 58 that is communicated, as seen, at one end to a passage 60 and at the other end to a passageway 62 via a valve seat 64. The passageway 62 is open to the outlet port 28 of the valve 14 that is connected to the conduit 32 leading to the port 33 of the servomotor opening into the control chamber 48 thereof.

Referring back now to FIGURE 1, the valve construction includes a valve housing formed of two sections 66 and 68 bolted together, as at 70, with the peripheral edges 72 of a diaphragm 74 placed between the sections to seal the joining of same. An electrical solenoid 76 is sealingly joined to the section 66, as at 78, about a valve plunger 80 having a poppet 82. The plunger and poppet are normally biased inwardly against a valve seat 84 in the housing section 66, as by a spring 86.

The valve seat 84 is located in the valve shown opposite the valve seat 64 and is about a passage 88 that is open at its other end to a control chamber 91 within the housing section 66.

At juncture of the housing sections 66 and 68 a cup-shaped plate 90 having appropriately located drilled openings therethrough is placed to rest upon the peripheral portions of the diaphragm, and a gasket 92 is placed thereabove so as to seal internal chambers upon joining the sections. The diaphragm 74 is provided with retaining means that mount it to a valve plunger 94 of solid construction. One of the retaining means is formed with upwardly extending flanges 96 that limit the upward position of the valve plunger 94, as biased by a spring 98. Thus, the diaphragm 74 divides a reference chamber 100 from the control chamber 91. It should be noted, at this time, that the passage 60 terminates in an angled passage 102 in the housing opening into the reference chamber 100.

At the uppermost end of the housing an atmospheric air inlet 104 is provided leading to an atmospheric air chamber 106 underneath a cap 108 that may be snap fitted to the housing portion 66. A tubular structure 110 is inserted through a drilled opening 112 in the housing section 66 to extend upwardly into the atmospheric chamber 106 from the control chamber 91. A nut 114 is threaded about the upper end of the tubular structure 110 in order to adjustably vary the length of the tubular structure projecting into the control chamber 91. In order to hold the tubular structure 110 against the housing section 66 so that the nut will properly position it, a spring 116 is compressed between a radial flange 118 of the tubular structure and the housing section 66. A seal 120 is fitted into a groove within the housing section 66 adjacent the control chamber 91 in order to seal the chamber 91 from the chamber 106. Internally of the tubular structure there may be provided a filter 122 in order to prevent contaminants within the atmospheric air from entering the control chamber. A valve 124 formed by a metal plate and a rubber facing is urged against a valve seat 126 affixed to the lowermost portion of the tubular structure 110 by a spring 128 placed between the metal plate and the structure 110.

In order to complete the construction of a power brake system in accordance with the principles of my invention, the button-type switch 26 on the steering wheel 19 is connected to a wire or lead 130 from the vehicle battery 16 and to a wire or lead 132 connected to the solenoid 76. Another conductor 134 connects the battery 16 to the solenoid. Thus, whenever the button 26 is depressed to close the contact thereof, the circuit from the battery 16 is complete to the solenoid 76.

It should be noted that by adjusting the position of the tubular structure 110 within the control chamber 91, a limited pressure differential may be provided across the wall 36 or a maximum differential. In other words, whenever a pressure within the control chamber 91 is of sufficient magnitude to create a pressure differential across the diaphragm 74 referencing the pressure in the control chamber 52, the plunger 94 will move away from the rubber facing of the valve 124 to allow it to seat on the valve seat 126 thereby limiting the amount of pressure within the chamber 91. In the attitude shown, the valve 14 would not be able to provide any pressure differential across the wall 36, as the tubular structure 110 is positioned so that the valve 124 will always be spaced from the plunger 94. It must be remembered, therefore, that after assembly of the valve 14 to the vehicle the cap 108 will be removed and the nut 114 loosened so that spring 116 will raise the valve 124 from the valve seat 126 until a predetermined pressure exists in the control chamber 91, as may be determined by attaching a gauge to an appropriately located opening thereinto. During this adjustment the engine should be running in order to provide a vacuum via the check valve 56 to the control chamber 52 and thence to the reference chamber 100.

Prior art designs have utilized a hollow plunger in place of our solid plunger 94 in order to provide a reference pressure in chamber 100. However, in such systems vacuum leakage produced detrimental erratic behavior of the system with varying manifold vacuums. It should be pointed out that the reference chamber 100 was, in such prior art systems, provided with an inlet embodying a check valve that was connected directly to the manifold 24. By incorporating the internal passage 60 in the vacuum chamber 58, this invention permits the referencing of the constant vacuum within the control chamber 52 in an unapplied attitude thereof which will not change due to releasing of the throttle on the vehicle such as will happen within the manifold 24, i.e., whenever the accelerator is released in the vehicle, the intake manifold vacuum will rise above the level more familiarly experienced therein. In the prior art valves this meant that a differential across the diaphragm connecting the valve operating plungers of these devices was increased so that cycling of atmospheric and vacuum pressure into the control chamber 91 was experienced. In the system proposed by the subject invention the utilization of the vacuum within the power brake unit 10 as a reference will provide a stable operation for the valve plunger 94 that is not possible with the prior art devices.

In operation, assuming the standard operation of the brake pedal 20 to be of little or no significance, the operator of the vehicle will place a finger on the button-type switch 26 to complete the circuit to the solenoid 76 withdrawing the plunger 80 so that the valve poppet 82 will translate from the seat 84 to the seat 64. This will close communication of chambers 52 and 48 and open communication of control chamber 91 to control chamber 48 of the unit 10.

Having fully described the construction and operation of the invention, I now wish to set forth the scope of protection sought by this patent as follows.

I claim:

1. A power brake system having fluid pressure operated servomotor controlled by a brake pedal, which servomotor includes at least two movable walls dividing said servomotor into first and second pressure chambers and first and second control chambers for operating a master cylinder to actuate a vehicle's brakes, said system comprising:

a remote switch means controlling an electrical power source; and a solenoid valve operatively connected to said power source via said switch means, said solenoid valve having a passageway normally communicating said first and second control chambers and a valve chamber normally closed from said passageway by a plunger valve controlled by said switch means such that opening of said valve chamber terminates communication of said first and second control chambers and opens said valve chamber to said second control chamber, said solenoid valve also having passage means communicating said first control chamber at all times to a pressure responsive valve means to provide the volume of said first and second pressure chambers and said first control chamber to dampen the reference pressure on said valve means in creating a pressure differential on the movable wall between said second pressure chamber and said second control chamber.

2. A power brake system according to claim 1 wherein said pressure responsive valve means includes an adjustable inlet for atmospheric air pressure, a spring biased valve in said inlet, a valve plunger for operating said spring biased valve, and a diaphragm mounting said plunger to said housing while creating first and second variable volume chambers with said valve in said first chamber and an inlet for said second variable volume chamber that is communicated by conduit means to said control chamber of the other movable wall to provide a stable reference pressure for controlling said spring biased valve.

3. A power brake system according to claim 2 and further characterized as having said remote switch means located on the steering means for an associated vehicle.

4. A power brake system for a vehicle including a vacuum operated servomotor, a vacuum source connected to said servomotor via a check valve to permit storage of vacuum in said servomotor, a master cylinder operatively connected to said servomotor, a means to operate said servomotor and/or master cylinder, a wheel brake operatively connected to said master cylinder, and the improvement of a remote means to control said servomotor, said remote means comprising:

an electrical circuit including an electrical source and a switch for controlling the supply of same;

a valve means having a solenoid operatively connected to said switch, said solenoid adapted to translate a valve stem, said valve means also having a housing with an inlet port, an outlet port, a valve chamber, a first internal passage connecting said inlet port to said valve chamber, a second internal passage leading from said valve chamber, and a third internal passage communicating said inlet port and said outlet port, said housing also having a first valve seat about the end of said second passage whose beginning is in said valve chamber, and a second valve seat operatively arranged in said third passage, and a valve poppet means connected to said valve stem to open and close said first and second valve seats which are arranged such that closure of said second valve seat opens said first valve seat to close said first passage and open said second passage with said third passage;

a tubular structure adjustably positioned with respect to said housing to variably extend into said valve chamber from one direction, said tubular structure having an open end and a resiliently biased valve therewithin for closing the other end in said valve chamber;

a means to control said resiliently biased valve including a solid plunger, a pressure responsive wall connected thereto and to said housing in said valve chamber above the entry of said first passage thereinto, and a spring between said housing and said plunger biasing said plunger and wall towards said tubular structure; and conduit means to connect said inlet to said vacuum storage in said servomotor and to connect said outlet to said servomotor for controlling a movable wall therewithin by suspending same in a constant vacuum or by moving same by creating a differential thereacross while referencing said constant vacuum in said control means to produce a stable system.

5. A power brake system according to claim 4 and further characterized as having tandem movable walls in said servomotor with first and second control chambers therefor with said conduit means including a first conduit connected to said first control chambers and said inlet port of said valve housing and a second conduit connected to said outlet port of said valve housing and to said second control chamber such that said valve means schedules concurernt actuation of said tandem movable walls and independent actuation of one wall of said servomotor.

References Cited
UNITED STATES PATENTS 2,057,707  10/1936  Carroll _____ 188—106
3,196,618  7/1965  Farmery et al. _____ 60—54.6

MARTIN P. SCHWARDRON, *Primary Examiner.*
ROBERT R. BUNEVICH, *Examiner.*